March 15, 1960 R. W. OBERLY 2,928,726
CORROSION TESTING DEVICE
Filed May 9, 1955
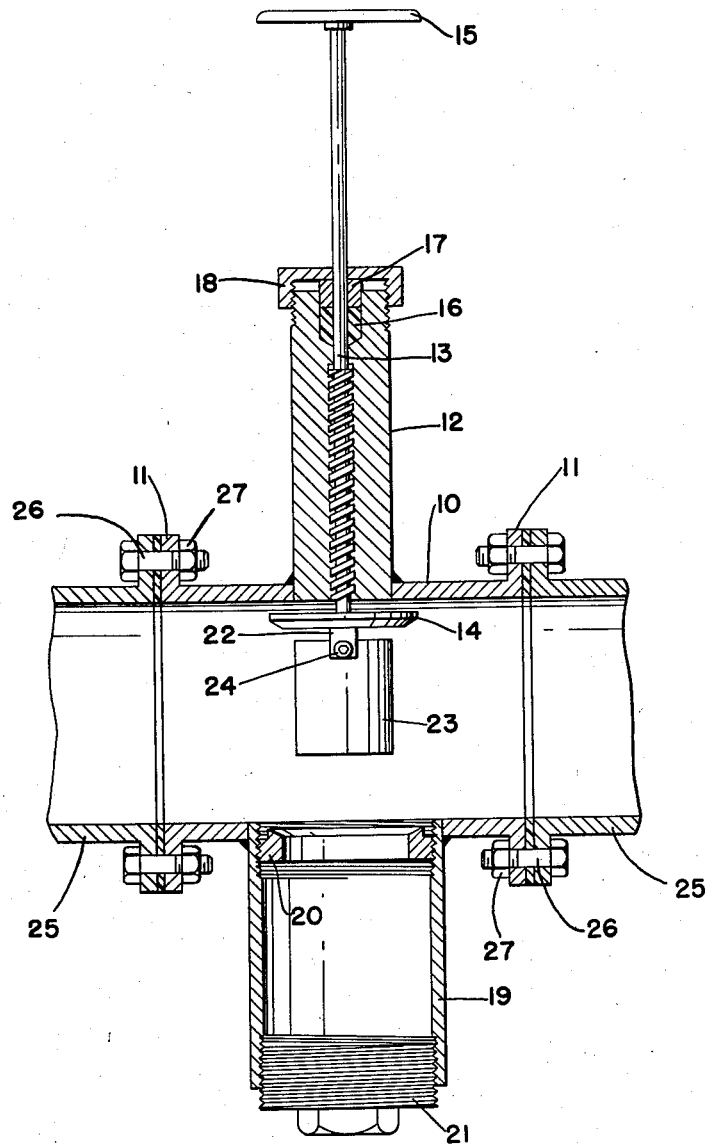
INVENTOR.
RICHARD W. OBERLY
BY
ATTORNEY United States Patent Office 2,928,726
Patented Mar. 15, 1960

2,928,726

CORROSION TESTING DEVICE

Richard W. Oberly, Lima, Ohio, assignor to The Standard Oil Company, Cleveland, Ohio, a corporation of Ohio Application May 9, 1955, Serial No. 506,889

2 Claims. (Cl. 23—253)

The present invention relates to a device designed to facilitate the determination of corrosion rates of various metals under service conditions. More particularly, the invention relates to a device adapted to place a sample of a metal into a pipe line in service whereby the corrosion rate of the metal may be measured under service conditions.

In many of the modern continuous process industries such as chemical, petroleum, food processing and like industries, the selection of a material of construction is of critical importance. This is particularly true of the selection of the materials for use in pipe lines which are commonly and extensively employed in such industries. In many cases, one of the most important factors in selecting a material for use in pipe lines is the corrosion rate of the material. In a plant having several thousand feet of pipe, the corrosion rate of the piping under service conditions will have an important effect on the overall profitability of the operation.

Unfortunately, however, it is not possible on the basis of any existing laboratory tests to predict with complete accuracy the behavior of any given material in the plant. The outstanding difficulty in this connection lies not so much in carrying out the tests as in interpreting the results and translating them into terms of plant performance. A laboratory test of the standardized type gives but one factor, the chemical resistance of the proposed material to the corrosive agent, and there are numerous other factors entering into the behavior of the materials in the plant.

Accordingly, it has been found desirable to test samples of likely materials of construction under service conditions. This has usually been accomplished simply by placing, during shut-downs of the operation, spools of the material to be tested in a place where it would be subjected to the service conditions. However, such a method necessarily precluded the removal of the sample specimen except during those intervals when the process was not in operation.

One of the objects of this invention, therefore, is to provide a means for determining the corrosion rate of materials of construction under service conditions which is not dependent upon the operation of the process.

More particularly, it is the object of this invention to provide a device by means of which a sample of a material of construction may be inserted in and withdrawn from a pipe line so that its corrosion rate may be determined while continuing to operate the pipe line.

To the accomplishment of the foregoing and related ends, I have invented a device comprising a hollow member adapted to be connected into a fluid conduit. The device includes a means capable of inserting and withdrawing the sample of the metal to be tested into the hollow member and an external receptacle connected to the hollow member and adapted to receive the sample under test.

The invention will be better understood by reference to the accompanying patent drawing where a cross-sectional view of an illustrative embodiment of the device of this invention is shown.

Referring now to the patent drawing, a section of pipe 10 has a diameter conforming generally to the diameter of the line in which the device is to be inserted. The pipe 10 is bounded on both ends by the flanges 11 by means of which it is possible to secure the pipe 10 in position in the pipe line. Attached to the pipe 10 is a bonnet 12 which is welded or otherwise affixed to the pipe 10. A valve stem 13 runs through the bonnet 12 and extends into the pipe 10. A valve disc 14 is attached to the end of the stem 13 and is within the pipe 10. Attached to the external end of the valve stem 13 is a hand wheel 15. The bonnet includes the usual packing gland 16 and follower 17 which are secured in position by means of the packing nut 18.

Attached to the bottom of the valve stem 13 below the valve disc 14 is the adjustable clamp 22 adapted to secure a sample specimen 23 by means of the set screw 24.

An external receptacle or coupling 19 is attached to the pipe 10 and is aligned with the valve means. The coupling 19 contains the valve seat 20 and is sealed by means of the removable plug 21.

In operation, the device is first inserted into the pipe line 25 and secured thereto by means of the flanges 11, the bolts 26, and the nuts 27. The sample specimen is held in the stream of fluid flowing through the pipe 10 so as to be subjected to said fluid as shown in the drawing. In order to remove the sample specimen 23 from the line, the valve stem 13 is turned until the valve disc 14 is in sealing engagement with the valve seat 20. This projects the sample specimen into the coupling 19. The removable plug 21 is then removed and the sample specimen 23 may then be removed from the clamp 22 without any appreciable amount of the fluid escaping or otherwise interfering with the flow in the pipe. Another sample specimen 23 may then be inserted in the clamp 22. The plug 21 may then be reinserted in the coupling 19 and the valve stem 13 is raised so that the sample 23 is in the line of flow of the fluid passing through the pipe section 10.

In this manner a device has been provided which permits the determination of the corrosion rate of a sample specimen of a material of construction in a pipe line under service conditions without interference with the operation of that pipe line.

It will be obvious to those skilled in the art that modifications of the device shown and described in the illustrative embodiment of this invention may be accomplished, but it is intended to cover all such modifications of the device as would reasonably fall within the scope of the appended claims.

I claim:

1. A device for the testing of materials under service conditions comprising a substantially unobstructed conduit through which a liquid is passed, a valve disc movably mounted within said conduit, a receptacle attached to said conduit having first and second openings therein, the first of said openings in said receptacle normally in open communication with said conduit, a valve seat disposed in said first opening in said receptacle for receiving and seating said valve disc in sealing engagement, means normally sealing said second opening in said receptacle, means for securing a specimen, said means carried by said valve disc adjacent the seating side thereof, means for moving said valve disc and said specimen securing means whereby said specimen securing means will be within said receptacle when said valve disc is in sealing engagement with said valve seat.

2. The device set forth in claim 1 wherein said receptacle and said means for moving said valve disc and said specimen are disposed perpendicular to the axis of said conduit.

References Cited in the file of this patent

UNITED STATES PATENTS

| | | |
|---|---|---|
| 1,683,489 | Rice | Sept. 4, 1928 |
| 2,426,369 | Paulsen | Aug. 26, 1947 |

FOREIGN PATENTS

| | | |
|---|---|---|
| 5,977 | Great Britain | of 1888 |
| 6465/27 | Australia | Mar. 17, 1928 |
| 7,521 | Australia | May 23, 1928 |